United States Patent
Nissen et al.

(10) Patent No.: US 11,220,355 B2
(45) Date of Patent: Jan. 11, 2022

(54) NONDESTRUCTIVE INSPECTION TECHNIQUES FOR ROTORCRAFT COMPOSITES

(71) Applicant: Bell Helicopter Textron Inc., Fort Worth, TX (US)

(72) Inventors: Jeffrey P. Nissen, Fort Worth, TX (US); Edward Hohman, Mansfield, TX (US); Robert J. Barry, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 16/204,995

(22) Filed: Nov. 29, 2018

(65) Prior Publication Data

US 2019/0168892 A1    Jun. 6, 2019

Related U.S. Application Data

(63) Continuation-in-part of application No. 13/946,805, filed on Jul. 19, 2013, now abandoned.
(Continued)

(51) Int. Cl.
*B64F 5/60* (2017.01)
*H04N 5/33* (2006.01)
(Continued)

(52) U.S. Cl.
CPC .......... *B64F 5/60* (2017.01); *G01N 21/3581* (2013.01); *G01N 21/8806* (2013.01);
(Continued)

(58) Field of Classification Search
CPC . G06T 2207/10048; G06T 2207/30164; G06T 7/0004; H04N 5/33
(Continued)

(56) References Cited

U.S. PATENT DOCUMENTS 4,647,220 A * 3/1987 Adams ................... G01N 25/72
374/5
4,970,597 A 11/1990 Shepard
(Continued)

OTHER PUBLICATIONS

Servais "Development of a New NDT Method Using Thermography for Composite Inspection on Aircraft with Portable Military Thermal Imager" ECNDT 2006—We.4.1.1, Sep. 2, 2007.*
(Continued)

*Primary Examiner* — James T Boylan
(74) *Attorney, Agent, or Firm* — Edwin S. Flores; Daniel J. Chalker; Chalker Flores, LLP

(57) ABSTRACT

A field deployable infrared imaging (FDIR) system and method for inspecting a composite component comprises a hand-held long-wave IR camera to capture a thermal image of the composite component, wherein the camera has an adjustable temperature control that captures an image with a 10 degree working range, a frame capture rate of at least 1 second for a length of time of not less than 90 seconds; and a processor for post-processing the thermal image using a second order derivative algorithm wherein the post-processed thermal image shows the defect better than the captured infrared image, and detects the one or more defects in the composite component.

14 Claims, 9 Drawing Sheets

Related U.S. Application Data

(60) Provisional application No. 61/673,506, filed on Jul. 19, 2012.

(51) Int. Cl.
   | | |
   |---|---|
   | *G06T 7/00* | (2017.01) |
   | *G01N 21/3581* | (2014.01) |
   | *G01N 21/95* | (2006.01) |
   | *G06T 5/00* | (2006.01) |
   | *G01N 21/88* | (2006.01) |
   | *G01N 21/84* | (2006.01) |

(52) U.S. Cl.
   CPC ............. *G01N 21/95* (2013.01); *G06T 5/007* (2013.01); *G06T 7/0004* (2013.01); *H04N 5/33* (2013.01); *G01N 2021/8472* (2013.01); *G06T 2207/10048* (2013.01); *G06T 2207/10152* (2013.01)

(58) Field of Classification Search
   USPC ........................................................ 348/125
   See application file for complete search history.

(56) References Cited

U.S. PATENT DOCUMENTS

| | | | |
|---|---|---|---|
| 5,136,383 A | 8/1992 | Shepard et al. | |
| 5,350,481 A | 9/1994 | Shepard et al. | |
| 5,404,162 A | 4/1995 | Sass et al. | |
| 5,631,465 A | 5/1997 | Shepard | |
| 5,683,181 A | 11/1997 | Shepard | |
| 5,716,030 A * | 2/1998 | LaFiandra | B64G 1/222 |
| | | | 244/129.4 |
| 5,982,422 A | 11/1999 | Flath et al. | |
| 6,000,844 A | 12/1999 | Cramer et al. | |
| 6,495,833 B1 * | 12/2002 | Alfano | G01N 21/4795 |
| | | | 250/330 |
| 6,516,084 B2 | 2/2003 | Shepard | |
| 6,585,146 B2 | 7/2003 | Shepard | |
| 6,751,342 B2 | 6/2004 | Shepard | |
| 6,795,784 B1 | 9/2004 | Shepard | |
| 7,083,327 B1 | 8/2006 | Shepard | |
| 7,186,981 B2 | 3/2007 | Shepard et al. | |
| 7,724,925 B2 | 5/2010 | Shepard | |
| 8,077,995 B1 * | 12/2011 | Terre | G06T 5/40 |
| | | | 250/330 |
| 9,031,734 B2 | 5/2015 | Froom | |
| 2001/0055116 A1 | 12/2001 | Maczura et al. | |
| 2002/0172410 A1 * | 11/2002 | Shepard | G01N 25/72 |
| | | | 382/141 |
| 2003/0229458 A1 * | 12/2003 | Alfano | G01N 21/88 |
| | | | 702/40 |
| 2004/0105264 A1 * | 6/2004 | Spero | B60Q 1/04 |
| | | | 362/276 |
| 2006/0017911 A1 | 1/2006 | Villar et al. | |
| 2008/0111078 A1 * | 5/2008 | Sun | A61B 5/015 |
| | | | 250/341.6 |
| 2008/0151052 A1 | 6/2008 | Erel et al. | |
| 2010/0100275 A1 | 4/2010 | Mian et al. | |
| 2011/0169961 A1 | 7/2011 | Wu | |
| 2012/0169884 A1 | 7/2012 | Dodds et al. | |
| 2012/0320372 A1 | 12/2012 | Troy et al. | |
| 2013/0188058 A1 * | 7/2013 | Nguyen | G01J 5/02 |
| | | | 348/164 |
| 2013/0261876 A1 * | 10/2013 | Froom | G01M 5/0016 |
| | | | 701/29.3 |
| 2014/0022380 A1 | 1/2014 | Nissen et al. | |

OTHER PUBLICATIONS

Internet Wayback Machine date for NPL above.*

* cited by examiner

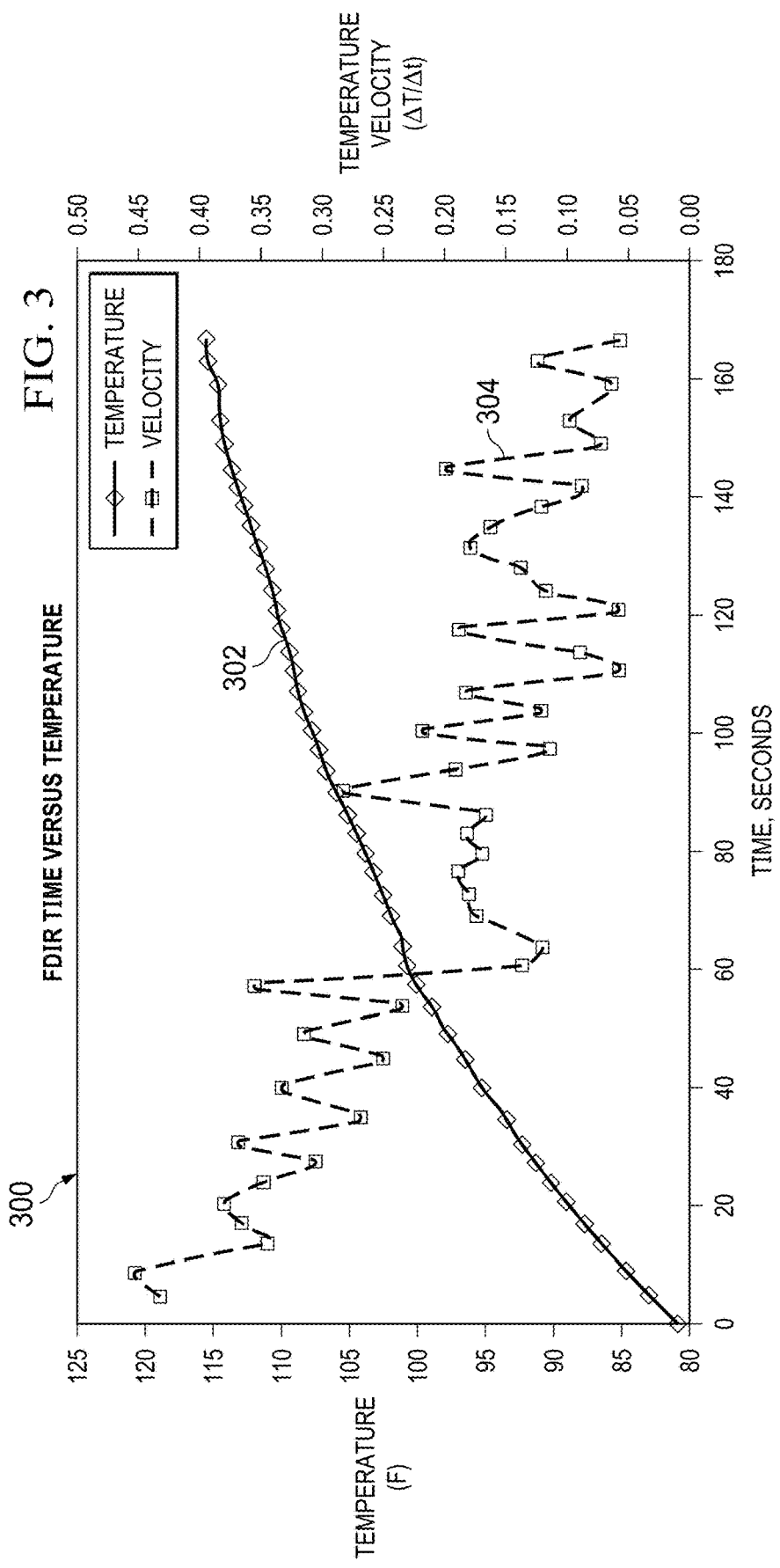

NONDESTRUCTIVE INSPECTION TECHNIQUES FOR ROTORCRAFT COMPOSITES

CROSS-REFERENCE TO RELATED APPLICATIONS

The present application is a Continuation-in-part of, and claims priority to, U.S. application Ser. No. 13/946,805, filed Jul. 19, 2013, and claims priority under 35 U.S.C § 119(e) to U.S. Provisional Patent Application No. 61/673,506 filed on Jul. 19, 2012 by Nissen, et al., entitled "Nondestructive Inspection Techniques for Rotorcraft Composites," the disclosure of each of which is hereby incorporated by reference in its entirety.

STATEMENT REGARDING FEDERALLY SPONSORED RESEARCH OR DEVELOPMENT

This invention was made with Government support under Contract No. DTFACT-09-C-00011 6XV9 awarded by the Federal Aviation Administration. The Government has certain rights in the invention.

REFERENCE TO A MICROFICHE APPENDIX

Not applicable.

BACKGROUND

Composite components, including, but not limited to, rotorcraft composite components, are generally susceptible to damage such as delamination, voids, water ingression, and impact damage. Due to the substantial cost and the increasing use of composite components, nondestructive inspection methods are often necessarily employed to inspect such components for damage. Traditional nondestructive inspection methods generally involve tap or coin testing and ultrasonic inspection. These traditional methods can be extremely expensive to employ, require higher levels of operator training to both administer the inspection and interpret the results, and are significantly slower to perform compared to wide-area inspection techniques. Accordingly, there exists a need for a nondestructive inspection system that provides generally unskilled nondestructive inspection personnel a portable, low-cost, and easily-implemented tool to rapidly inspect and assess composite components for damage.

SUMMARY

In some embodiments of the disclosure, an apparatus is disclosed as comprising an infrared camera configured to capture an infrared image of a composite component, and a processing system coupled to the camera, wherein the processing system is configured to process the captured infrared image and determine whether a defect exists within the composite component. In other embodiments of the disclosure, an apparatus is disclosed as comprising an infrared camera configured to capture an infrared image of a composite component at a wavelength of at least one of a range of about 1,000 to about 2,000 nanometers, a range of about 3,000 to about 5,000 nanometers, and a range of about 8,000 to about 12,000 nanometers, a processing system coupled to the camera, wherein the processing system is configured to process the captured infrared image on a pixel-by-pixel basis and determine whether a defect exists within the composite component, and a user interface coupled to the processing system and configured to process the captured infrared image on a pixel-by-pixel basis and produce a processed image, wherein the processed image shows the defect better than the captured infrared image. In yet other embodiments of the disclosure, a method is disclosed as subjecting a composite component to infrared radiation, capturing a thermal image of the composite component, inspecting the captured thermal image for defects in the composite component, and post-processing the thermal image using first and second order derivative algorithm wherein the post-processed thermal image shows the defect better than the captured infrared image.

In one embodiment, the present invention includes a method for detecting defects in a composite component of an aircraft comprising: subjecting the composite component to infrared radiation; using a hand-held, long-wavelength IR camera to capture a thermal image of the composite component, wherein the camera has an adjustable temperature control, captures an image having a 10 degree working range, a frame capture rate of at least 1 second (minimum) for a length of time of not less than 90 seconds, wherein the image is detected within a predetermined amount of time from a start of a temperature change; and post-processing the thermal image using a second order derivative algorithm wherein the post-processed thermal image shows more detail of defects than the captured infrared image, and detects the one or more defects in the composite component. In one aspect, the method further comprises providing a user interface coupled to the processing system and configured to process the captured infrared image on a pixel-by-pixel basis and produce a processed image, wherein the processed image shows more detail of defects than the captured infrared image. In another aspect, the processing system is configured to enhance the contrast of the captured infrared image using at least one of a first order derivative algorithm and a second order derivative algorithm. In another aspect, the method further comprises providing input and output devices coupled to the processing system and configured to communicate with an external device to transfer the captured infrared image, the processed image, or both. In another aspect, the method further comprises providing an environmental sensor coupled to the processing system and configured to detect an environmental factor and associate the environmental factor with the captured infrared image. In another aspect, the method further comprises providing location position sensing devices coupled to the processing system and configured to provide location-based data. In another aspect, the method further comprises providing an emitter configured to emit infrared radiation onto the composite component at a first wavelength range, wherein the infrared camera captures images at a second wavelength range, and wherein the first wavelength range is different from the second wavelength range. In another aspect, the first wavelength range comprises a wavelength from about 800 nanometers to about 2,500 nanometers. In another aspect, a change in temperature of an aircraft is caused by: moving the aircraft our of a hanger and into sunlight, out of the sunlight and into a hanger, by forced air, by removing thermal blankets, or other exposure to a change in temperature that affects a large area of the aircraft. In another aspect, a large area thermal image of a temperature-soaked aircraft, or part thereof, is captured within 60 seconds of being introduced to delta temperature difference. In another aspect, the second wavelength range comprises a wavelength from about 1,000 nanometers to about 2,000, 5,000 nanometers, or 12,000 nanometers. In another aspect, the defect is a structure of an aircraft made of fiber reinforced composite materials of low thermal conductivity and the area of detection is a sub-structure, or a fiber reinforced composite materials of low thermal conductivity located on a metallic sub-structure, and the processed image shows integrity and location on the aircraft. In another aspect, the long wave IR camera is a receiver of available thermal excitation sunlight, ambient, or forced air resulting in a minimum delta of 10 degrees Fahrenheit over a structure having a homogeneous temperature. In another aspect, the composite component is located on an aircraft. In another aspect, the method further comprises using a low cost, a long-wave camera having integrated processor, environmental sensor, I/O devices and a user interface. In another aspect, the method further comprises moving the aircraft into sunlight, into shade, or to a location with a change in environmental temperature prior to capturing the image. In another aspect, the method further comprises capturing the image within 30, 60, 90, or 120 seconds from the change in environmental temperature.

In another embodiment, the present invention includes an apparatus, comprising: a hand-held long-wave IR camera to capture a thermal image of the composite component, wherein the camera has an adjustable temperature control that captures an image with a 10 degree working range, a frame capture rate of at least 1 second for a length of time of not less than 90 seconds; a processing system coupled to the camera, wherein the processing system is configured to process the captured infrared image on a pixel-by-pixel basis and determine whether a defect exists within the composite component; and a user interface coupled to the processing system and configured to process the captured infrared image on a pixel-by-pixel basis and produce a processed image, wherein the processed image shows the defect better than the captured infrared image. In one aspect, the processing system is configured to enhance the contrast of the captured infrared image using a second order derivative algorithm. In another aspect, the apparatus further comprises an emitter configured to emit infrared radiation at a wavelength between about 800 nanometers and about 2,500 nanometers onto the composite component. In another aspect, the emitter is configured to emit infrared radiation comprising an intensity of at least about 200 watts per meter squared ($W/m^2$). In another aspect, the composite component is located on an aircraft. In another embodiment, the present invention includes an apparatus operable to detect defects in a composite component of an aircraft comprising: a hand-held long-wave IR camera to capture a thermal image of the composite component, wherein the camera has an adjustable temperature control that captures an image with a 10 degree working range, a frame capture rate of at least 1 second for a length of time of not less than 90 seconds; and a processor for post-processing the thermal image using a second order derivative algorithm wherein the post-processed thermal image shows the defect better than the captured infrared image, and detects the one or more defects in the composite component. In another aspect, the infrared radiation comprises a first wavelength between about 800 nanometers and about 2,500 nanometers and an intensity of at least about 200 watts per meter squared ($W/m^2$), and wherein the capturing the thermal image comprises capturing the thermal image at a first wavelength of at least one of: a range of about 1,000 to about 2,000 nanometers; a range of about 3,000 to about 5,000 nanometers; and a range of about 8,000 to about 12,000 nanometers. In another aspect, a high emissive black coating is applied to the composite component prior to subjecting the composite component to infrared radiation. In another aspect, a thermal image of the composite component occurs at an offset angle of at least about 10 degrees from the infrared radiation. In another aspect, the composite component is located on an aircraft.

BRIEF DESCRIPTION OF THE DRAWINGS

For a more complete understanding of the present disclosure and the advantages thereof, reference is now made to the following brief description, taken in connection with the accompanying drawings and detailed description:

FIG. 3 is a temperature versus time graph of the effect of exposing a composite component to infrared radiation according to an embodiment of the disclosure;

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide a field-deployable infrared imaging (FDIR) system to inspect composite rotorcraft components for damage. For example, in cases where rapid inspection of large area composite components may be necessary, it may be desirable to provide an ultra-portable, low-cost, and easily-implemented system to rapidly inspect and assess rotorcraft composite components for damage. In some embodiments of the disclosure, systems and methods are disclosed that comprise providing an FDIR system for inspecting composite components that comprises an emitter configured to impart heat into a composite component via infrared radiation, an infrared camera configured to capture an infrared image of the composite component, and a processing system configured to process (e.g. post capture process) the infrared image. As used herein, the terms "long wavelength infrared" or "long wave IR" refer to a wavelength of between 4 to 15 micrometer wavelength, and in certain embodiments, 4 to 10 micrometer wavelength, and in other embodiments, 8 to 15 micrometer wavelength. This wavelength is also referred to as the "thermal infrared" and in the context of the present invention is used to obtain a passive image of objects at temperatures that are about room temperature, but can also include imaging of objects requiring no illumination such as exposure of the object to sunlight, moving the object from sunlight into the shade, moving the object into, or out of, a heated or cooler area of, e.g., an aircraft hangar. A sensor that detects long wave infrared is typically measuring at a frequency of about 20-27 THz, and is capable of detecting typical photon energy of, e.g., between 1.2 and 83 meV.

Figure 1A:
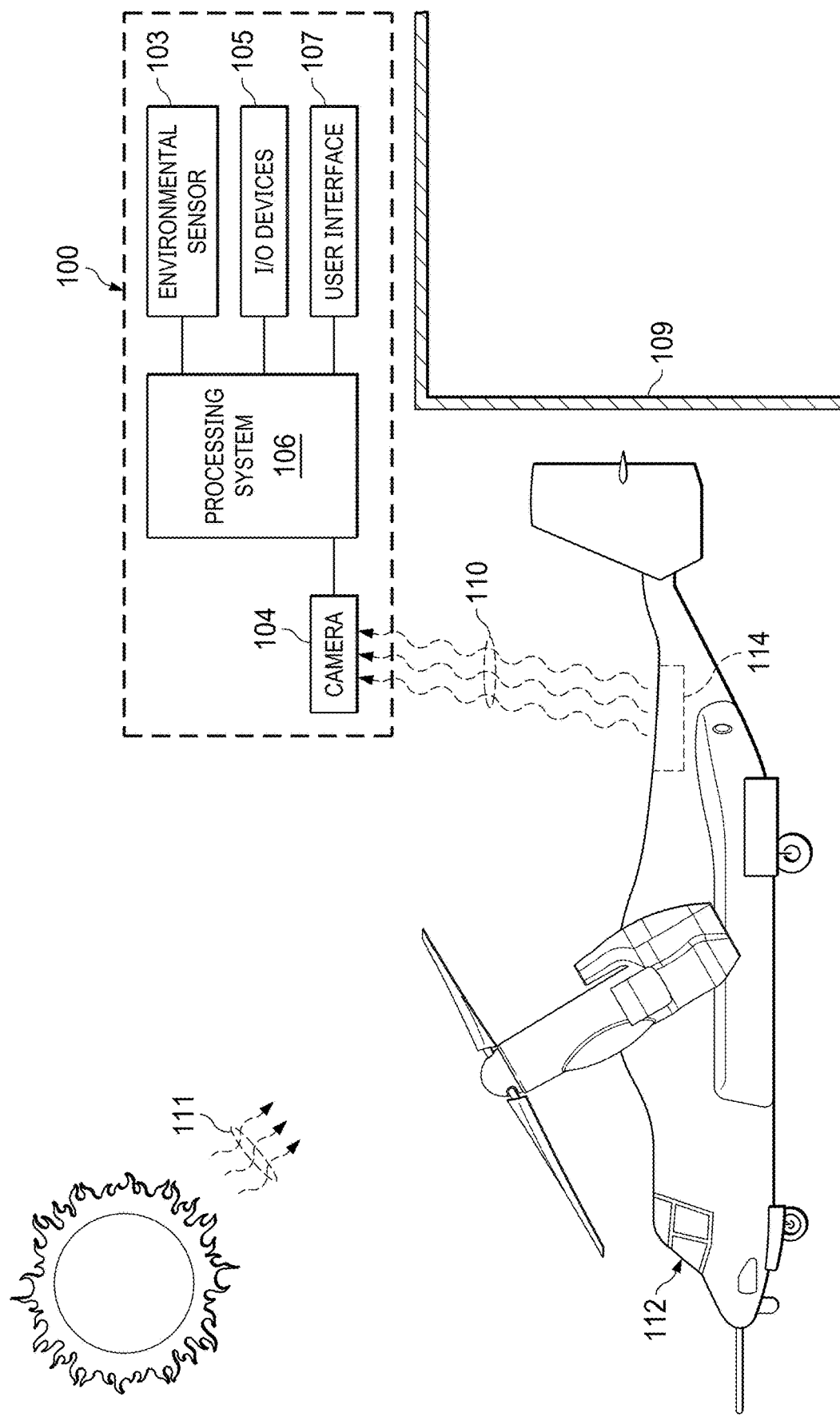
FIG. 1A is a schematic drawing of a field deployable infrared imaging (FDIR) system for use in sunlight or other change in the overall temperature of a target aircraft according to an embodiment of the disclosure.
Figure 1B:
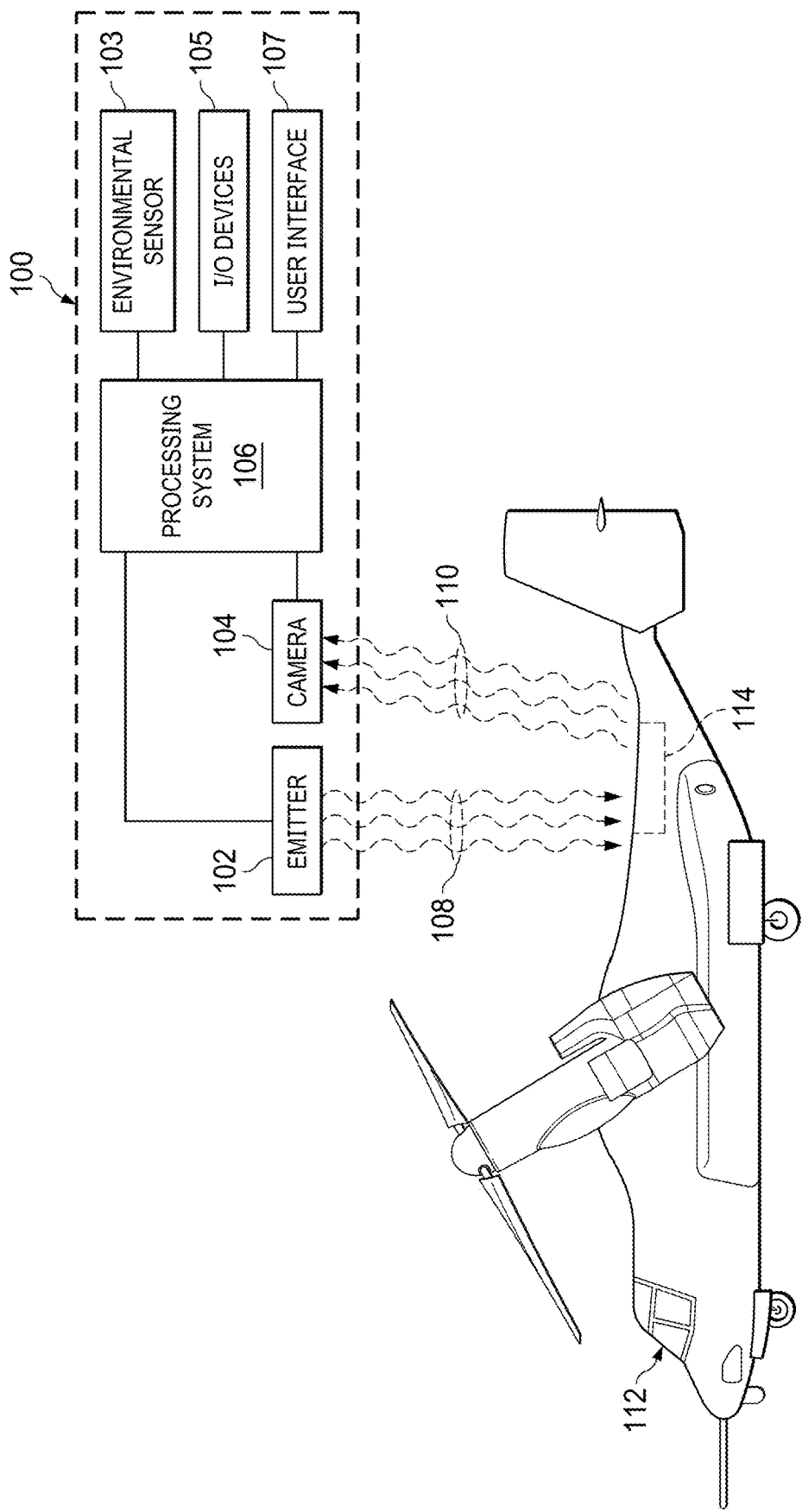
FIG. 1B is a schematic drawing of a field deployable infrared imaging (FDIR) system comprising a physically integrated emitter according to an embodiment of the disclosure.
Figure 1C:
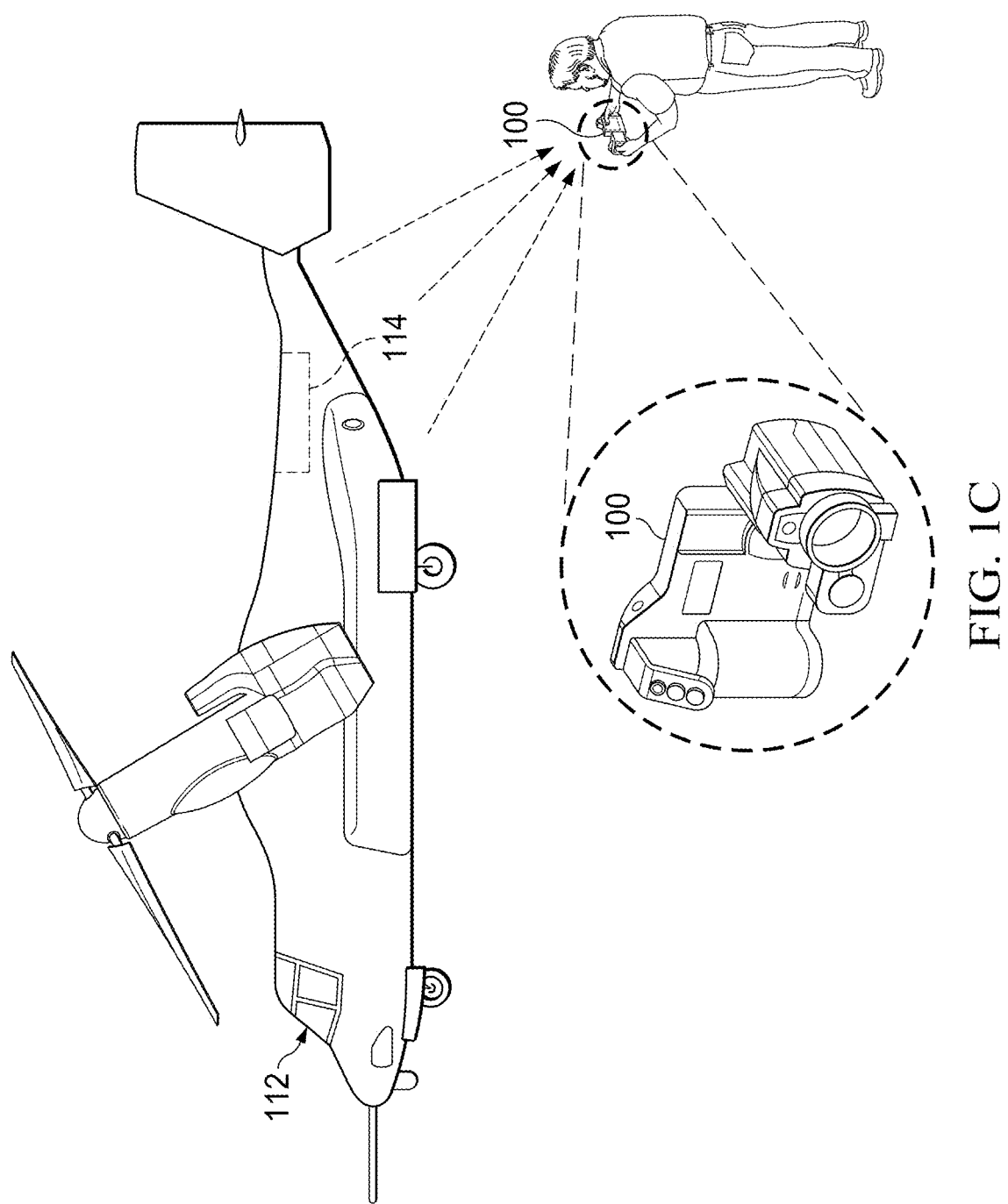
FIG. 1C shows an example of a device in operation using the present invention.

Referring now to FIGS. 1A, 1B, and 1C which are schematic drawings of an long wave FDIR system 100, that can be a hand-held system, used to measure defects 114 in an aircraft 112 by detecting the infrared radiation 110 emitted by the aircraft after being withdrawn from, in this image a hangar 109, and exposed to sunlight 111, that can be used in the context of an aircraft that has been taken out of a hangar 109 and placed in the sunlight 111, or vice-versa. However, the robust nature of the system of the present invention allows for the aircraft be placed under shadow (such as a tree or a thermal blanket), and upon exposure to, of from, sunlight, or a change in temperature around the aircraft 112, measure defects as taught herein. The typical context of use of the present invention is to detected flaws in the body of an aircraft by detecting changes in temperature as an aircraft is taken out of a hangar 109 and placed in sunlight 111 and using a long-wave IR camera with manual focus (e.g., camera 104), adjustable temperature controls to obtain a 10 degree working range, and capable of frame capture rate of 1 second (minimum) for a length of time not less than 90 seconds. While depicted using an emitter 102, the present invention does not require the use of any emitter, and can interrogate a large area of an aerospace structure made of, e.g., fiber reinforced composite materials of low thermal conductivity for the purpose of assessing sub-structure integrity and location. As used herein, the term "large area" refers to an area that is approximately 20×20 feet, 10×10 feet or even 5×5 feet. Large areas of interrogation of aerospace structures typically include fiber reinforced composite materials of low thermal conductivity located on the inspection side of a metallic sub-structure. Using the long wave IR camera as a receiver of available thermal excitation from various sources such as sunlight, ambient, or forced air, results in a minimum delta of 10 degrees Fahrenheit over a structure of homogeneous temperature. By capturing large area thermal images of a temperature soaked structure within 60 seconds of being introduced to delta temperature difference, the present invention is able to detect quickly and efficiently in a minimum length of time and out in the field, defects the show a loss of sub-structure integrity and the location of the defect in a fiber reinforced composite materials. Further, by using long wave IR detection, the present invention operates under, and is not limited to specific angles for capture. In other words, the present invention is capable of being operated in a hand-held manner by users with limited training and does not require a gantry system or other robotic system that requires that the camera is at a certain, specific angle from the surface. Finally, and surprisingly, the present invention was able to detect defects in fiber reinforced composite materials on surfaces that were painted with any color, and even through paint that is glossy or matte.

FIG. 1B shows another version of the present invention in which the FDIR system 100 may also include an emitter 102, and a processing system 106, coupled together, but as shown in FIG. 1A, the present invention can operate without the need for an emitter 102. In some embodiments, the FDIR system 100 may also comprise an environmental sensor 103, input/output (I/O) devices 105, and/or a user interface 107 coupled to the processing system 106. The emitter 102 may be configured to emit infrared radiation 108 onto a composite component 114. In some embodiments, the emitter 102 may comprise an auxiliary infrared light source. In other embodiments, the emitter 102 may comprise an auxiliary heat source (e.g. light emitting diode source or gas powered infrared heater). In some embodiments, the emitter 102 may comprise an auxiliary light and/or heat source configured to emit infrared radiation 108. In other embodiments, the emitter 102 may comprise an auxiliary light and/or heat source configured to rapidly heat a composite component 114 at least about 10-15° F. above ambient temperature. In some embodiments, the emitter 102 may be configured to emit infrared radiation 108 comprising a minimum wavelength of about 800 nanometers (0.8 µm). In some embodiments, the emitter 102 may be configured to emit infrared radiation 108 comprising a maximum wavelength of at least about 2,500 nanometers (2.5 µm). The emitter 102 may generally be any component configured to emit infrared radiation 108 with an intensity of at least about 200 watts per meter squared (W/m$^2$). In other embodiments, the infrared radiation 108 emitted by the emitter 102 may comprise an intensity of up to about 1,000 W/m$^2$. In some embodiments, the emitter 102 may generally be physically integrated into the FDIR system 100 as shown in FIGS. 1A, 1B, and 1C. The emitter 102 may also generally be configured to provide a continuous supply of infrared radiation 108 during inspection of a composite component 114, as opposed to a flash-type infrared radiation. Furthermore, the properties of the radiation emitted by the emitter 102 may generally be selected based on the properties of the composite component 114 being inspected. Properties of the composite component 114 that may affect selection of the emitter 102 may include, but are not limited to, size and thickness of the composite component 114, material type, resin type, and size and depth of defect being sought. FIG. 1C shows an example of a device in operation of the present invention in which the FDIR system 100 is a hand held device (in this case self-contained) for imaging a composite component 114 of the aircraft 112, in which the user images a large area of the aircraft, which large area is, e.g., an area that is 2×2, 4×4, 8×8, 10×10 feet, or can have a typical 4:3 aspect ratio (4×3, 8×6), or other aspect ratio and that is extremely portable and provides an inspection in the field and at a low cost, by simply taking an aircraft out of the hangar 109 and placing it in the sunlight (thus placing a large portion or the entire aircraft in the sunlight 111, or conversely, from a heated hangar into an lower temperature) and imaging according to the present invention. In operation, the user would (1) direct the camera at the area of interest on the aircraft 114, (2) compress the temperature range to obtain as much contrast as possible in the color palette, and (3) capture images in the first 60-90 seconds (as illustrated in FIG. 3, hereinbelow) after the panel(s)/fiber reinforced composite structure 114 has changed its temperature exposure at least 10 degrees F.

by, again, moving the target area of interest into, or shielded from, sunlight thereby creating a temperature gradient of a portion or the entire aircraft.

The camera 104 may generally be any device capable of capturing thermal images, such as a heat-sensitive camera. In some embodiments, the camera 104 may comprise an infrared imaging device sensitive to infrared radiation. Generally, the camera 104 may capture images of and/or view emitted/reflected infrared radiation 110 from the composite component 114 that results from the thermal flux created by the infrared radiation 108. Discontinuities in the composite component 114 generally affect the thermal flux imposed by the infrared radiation 108 and thus may generally be detected by the camera 104. In some embodiments, the camera 104 may generally be configured to detect a plurality of discontinuities and defects in a composite component 114. In some embodiments, the camera 104 may generally be configured to detect impact damage, delamination, voids, fluid ingression, and/or other various manufacturing defects such as the presence of foreign materials. Furthermore, in some embodiments, variations in thickness, material, shape, size and/or other physical features of the composite component 114 may also be detected in a thermal image captured by the camera 104.

The camera 104 may be configured to detect different wavelengths than those emitted by the emitter 102. In some embodiments, the camera 104 may generally be configured with a sensitivity to emitted infrared radiation 110 comprising a minimum wavelength of about 1,000 nanometers (1 μm) and a maximum wavelength of about 2,000 nanometers (2 μm). In other embodiments, the camera 104 may generally be configured with a sensitivity to emitted infrared radiation 110 comprising a minimum wavelength of about 3,000 nanometers (3 μm) and a maximum wavelength of about 5,000 nanometers (5 μm). In yet other embodiments, the camera 104 may generally be configured with a sensitivity to emitted infrared radiation 110 comprising a minimum wavelength of about 8,000 nanometers (8 μm) and a maximum wavelength of at least about 12,000 nanometers (12 μm). Still, in other embodiments, the camera 104 may generally comprise an infrared radiation sensitivity that is selectable between the ranges of about 1,000-2,000 nanometers, about 3,000-5,000 nanometers, and about 8,000-12,000 nanometers. The camera 104 may also generally comprise the capability of operating at high capture rates. For example, the camera 104 may comprise an image capture rate of about 24-32 frames per second up to about 100 frames per second.

The processing system 106 may generally comprise an image processing system. In some embodiments, the processing system 106 may be located within the same housing as the camera 104. In other embodiments, the processing system 106 may be an external, standalone device, such as, but not limited to, a computer. In some embodiments, the processing system 106 may comprise network connectivity devices, random access memory (RAM), read only memory (ROM), and/or secondary storage. In some cases, some of these components may not be present or may be combined in various combinations with one another or with other components not shown. These components might be located in a single physical entity or in more than one physical entity. The processing system 106 may generally execute instructions, codes, computer programs, or scripts that it might access from the network connectivity devices, RAM, ROM, or secondary storage (which might include various disk-based systems such as a hard disk, flash drive, or other similar drive). While only one processing system 106 is shown, multiple processing systems 106 may be present. Thus, while instructions may be discussed as being executed by a processor, the instructions may be executed simultaneously, serially, or otherwise by one or multiple processing systems 106.

The processing system 106 may generally be coupled to the emitter 102 and/or the camera 104. In some embodiments, the processing system 106 may also be employed to process images captured by the camera 104 and/or store the images within the camera 104. The processing system 106 may also be configured to post-process the images to achieve more detailed and/or superior results than the unprocessed images. In some embodiments, the processing system 106 may generally employ a configurable imaging software routine that may, inter alia, adjust contrast, sharpness, brightness, tint, and color. In some embodiments, the processing system 106 may employ a quantitative (pixel-by-pixel) software routine for post image capture processing the images as opposed to image subtraction or division. For example, the processing system 106 may comprise a first or second order derivative operation (e.g. velocity or acceleration of thermal data) for post-processing the images captured by the camera 104. In some embodiments, first or second order derivative processing may generally provide higher contrast images that enhance the display of structural information. First and second order derivative processing may result in a more detailed images that enable enhanced detection and/or identification of defects in a composite component 114. Furthermore, the processing system 106 may also be configured to automatically post-process images captured by the camera 104 at the direction of the user. In other embodiments, the processing system 106 may be configurable to post-process selected images captured by the camera 104. In some embodiments, the processing system 106 may also be configured to store the raw, unprocessed image and/or the related post-processed image. This real-time processing may further increase speed of inspection of a composite component 114.

In some embodiments, the FDIR system 100 may also comprise a user interface 107 coupled to the processing system 106. Generally, the user interface 107 may allow a user to selectably configure the FDIR system 100 and/or individual components of the FDIR system 100 (e.g. select wavelength and/or intensity of emitter 102; select infrared images to post-process, etc.). In some embodiments, the user interface 107 may comprise buttons, touch screen displays, keyboards, keypads, switches, dials, mice, track balls, voice recognizers, and/or other well-known user interface input mechanisms. In some embodiments, the user interface 107 may also comprise a liquid crystal display (LCD) for displaying and/or viewing images captured by the camera 104. In some embodiments, where the camera 104 may be configured to capture color images, the user interface 107 may comprise a color LCD for viewing the color images. In yet other embodiments, the user interface 107 may comprise a touch screen LCD.

In some embodiments, the FDIR system 100 may also comprise input/output (I/O) devices 105 coupled to the processing system 106. In some embodiments, the I/O devices 105 may be configured for image file transfer capabilities. In some embodiments, the I/O devices 105 may comprise a wired connection (e.g. a port) for transferring images to and/or from another electronic device. In some embodiments, the I/O devices 105 may comprise wireless communication capabilities (i.e. Wi-Fi, WiMAX, Bluetooth, etc.) for transferring files to and/or from another electronic device and/or computer. In some embodiments, the I/O devices 105 may comprise location and position sensing capability, such as Global Positioning System (GPS), photogrammetry, optical coordinate measurement system, or laser based tracking. Location and position sensing data associated with specific images may generally be useful for determining where an image was captured. In addition, some location and position sensing capability may also provide information specific to location on an aircraft fuselage or other large structure whose location is position-fixed to later enable an operator to precisely associate a captured image with a specific location on a large structure. This capability may be beneficial where images are captured and then remotely processed. Images that illustrate defects may then be associated with the specific component of an aircraft or other large structure utilizing the location and position sensing information to precisely determine the location of the damage.

In some embodiments, the FDIR system 100 may also comprise an environmental sensor 103. The environmental sensor 103 may also be coupled to the processing system 106. In some embodiments, the environmental sensor 103 may comprise an ambient temperature sensor, humidity sensor, and/or light sensor. In other embodiments, the environmental sensor 103 may comprise an infrared radiation sensor configured to measure ambient infrared radiation wavelength and/or infrared radiation intensity. In some embodiments, the environmental sensor 103 may be configured to measure a plurality of ambient environmental factors and/or properties of detected infrared radiation. In some embodiments, the environmental sensor 103 may be configured to transmit measured empirical data to the processing system 106. In some embodiments, the measured empirical data measured by the environmental sensor 103 may also be captured and associated with an infrared image. In some embodiments, the data captured by the environmental sensor 103 may be stored as metadata within the properties of an infrared image file. Furthermore, the FDIR system 100 may comprise a plurality of environmental sensors 103.

Still referring to FIGS. 1A, 1B and 1C, the FDIR system 100 may generally be utilized to inspect a composite component 114 of an aircraft 112 for defects. Composite component 114 is depicted as a composite panel of an aircraft fuselage for illustration purposes. However, the FDIR system 100 may be used to inspect a plurality of composite components of an aircraft 112 including, but not limited to, hat-stiffened panels, I-beam reinforced panels, wings, fuselages, and rotor blades. While an aircraft 112 is depicted for illustration purposes, the FDIR system 100 disclosed may generally be employed to conduct nondestructive inspection on any component, structure, or device employing composite materials, including, but not limited to, building infrastructures, automotive components, and bridges. Application of the FDIR system 100 generally requires a thermal flux between the composite component 114 under evaluation and the surrounding environment. If used, the emitter 102 may impose infrared radiation 108 onto the composite component 114 to create the requisite thermal flux between the composite component 114 and the surrounding environment. Accordingly, the infrared radiation 108 imposed on a composite component 114 must be of sufficient intensity to impart the requisite heat into the composite component 114. In some embodiments, the emitter 102 may be configured to emit infrared radiation 108 comprising an intensity of at least about 200 W/m$^2$. In other embodiments, the emitter 102 may emit infrared radiation 108 comprising an intensity of up to about 1,000 W/m$^2$. In some embodiments, the emitter 102 may be configured to emit infrared radiation 108 comprising a minimum wavelength of about 800 nanometers (0.8 μm). Furthermore, in some embodiments, the emitter 102 may be configured to emit infrared radiation 108 comprising a maximum wavelength of at least about 2,500 nanometers (2.5 μm). In yet other embodiments, however, the infrared radiation 108 may comprise natural sunlight.

Exposure time may be a consideration when using the FDIR system 100. In some embodiments, the exposure to infrared radiation 108 may comprise a time period of less than about 30 seconds. However, in other embodiments, the exposure time for enhanced defect detection may be appreciably longer. Longer exposure times may depend on many factors, including, but not limited to, properties of the composite component 114, depth and size of defect in the composite component 114, strength of infrared radiation 108, and/or ambient temperature. In some embodiments, where the infrared radiation 108 comprises an intensity of about 200 W/m$^2$, the test time may generally be limited to about one hour. In other embodiments, increasingly higher intensities of infrared radiation 108 may reduce effective exposure times.

In order for a defect in a composite component 114 to be detected, a measurable thermal difference between a defect and the surrounding structure of a composite component 114 must exist. When infrared radiation 108 is imposed onto a composite component 114, the composite component 114 may generally increase in temperature. Delaminations and other defects capable of detection with the FDIR system 100 generally may not conduct thermal energy as rapidly and/or may affect heat transfer through areas of a composite component 114 surrounding a defect. The camera 104 may generally be configured to remain sensitive to emitted infrared radiation 110 from the composite component and may generally be employed to capture a thermal image of the heated composite component 114. Accordingly, an infrared image captured by the camera 104 may depict the thermal differences created by defects present in the composite component 114, allowing a user to discover defects in a composite component 114 when the captured thermal image is viewed. In some embodiments, the ability to acquire images closer to the initial exposure to infrared radiation 108 may yield enhanced defect detection when the defects produce enhanced thermal fluxes in the composite component 114.

The FDIR system 100 may generally be configured to detect a plurality of defects in a composite component 114. In some embodiments, the FDIR system 100 may generally be configured to detect impact damage, delamination, voids, fluid ingression, and/or other various manufacturing defects such as the presence of foreign materials. In some embodiments, the FDIR system may also be employed to detect the substructure of a composite component 114 that may not be visible and/or known from the surface structure of the composite component 114 alone. In some embodiments, the FDIR system 100 may generally provide a system to inspect the largest area of inspection per hour as compared to traditional inspection methods. In some embodiments, the camera may be configured to capture images at a very close range (about 1 inch) with respect to the composite component 114 under inspection. In some embodiments, the FDIR system 100 may be configured to inspect large areas (at least 8 square feet per minute for small defects with defect size of about 1 inch diameter) and a significantly larger area with an increased defect size detection requirement. For example, in some embodiments, a 32"×32" inspection area with 6" overlap for each subsequent capture (about 26"×26" capture area) inspected from about 6 feet from the surface of the composite component 114 with a capture rate of about 4 seconds and an index time of about 8 seconds per capture yielded about 4.69 square feet per 12 seconds (1,407 square feet per hour).

A composite component 114 may generally comprise a plurality of layers of composite sheets bonded by a polymer resin. Each composite component 114 may comprise characteristics and/or properties that affect the use of the FDIR system 100. In some embodiments, size and thickness of the composite component 114 may affect the amount of imposed infrared radiation 108 that may be capable of penetrating the unseen substructure of a thick panel. In some embodiments, thicker composite panels (e.g. more than 5 layers) may require higher intensity infrared radiation 108 to provide a requisite thermal flux for defects to be detected than a thinner panel. Furthermore, the depth of defect may also impact results attained with the FDIR system 100. Deeper defects, similarly to thicker composite components 114, may require higher intensity infrared radiation 108 and/or longer exposure to the infrared radiation 108 to create the requisite thermal flux necessary to detect a defect. In some embodiments, defects at a depth of about 0.040" below the surface of the composite component 114 and comprising about a 1" diameter may be easily detected using an FDIR system 100. In other embodiments, FDIR system 100 may detect deeper defects depending on the configuration of the FDIR system 100. In yet other embodiments, FDIR system 100 may also detect much smaller defects depending on the configuration of the FDIR system 100.

In some embodiments, the conductive properties of the material and/or resin may generally affect the amount of heat absorbed from the imposed infrared radiation 108. Generally, the conductive properties of the resin may have the greatest impact on thermal flux in a composite component 114 created by the infrared radiation 108 imposed by the emitter 102. Thus, low conductive resins may limit the emitted infrared radiation 110 that the camera 104 can capture and/or may prolong the requisite exposure time of a composite component 114 to the imposed infrared radiation 108 in order for defects to become visible in a thermal image captured by the camera 104 of the FDIR system 100. Generally, composites comprising a specific heat of about 0.15-0.35 Cal/g-° C. may generally be well-suited for inspection with the FDIR system 100. Furthermore, composites comprising a thermal conductivity of about 1.2-6.0 W/m-° K. may generally be well-suited for inspection with the FDIR system 100.

Figure 2:
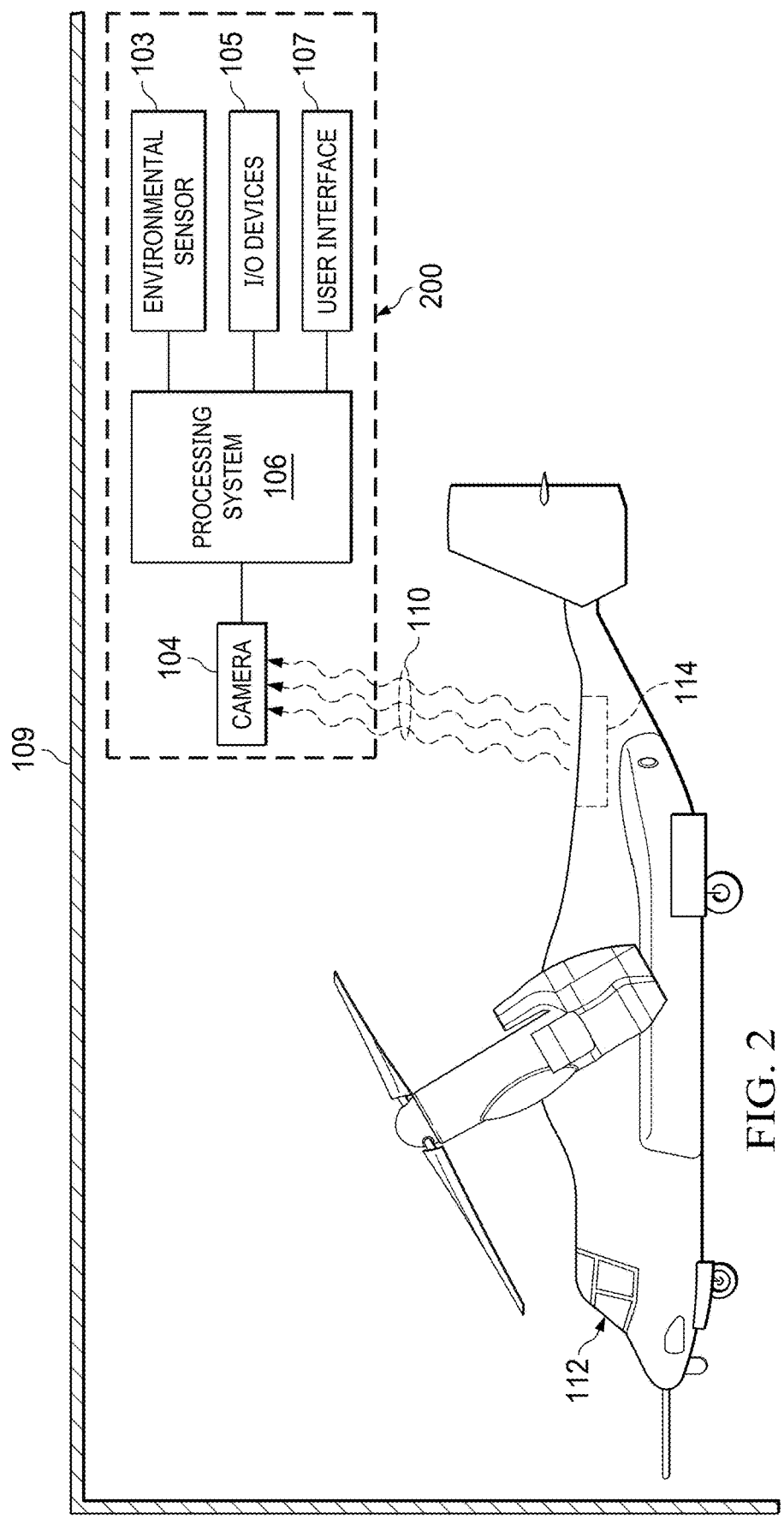
FIG. 2 is a schematic drawing of the FDIR system according to an embodiment of the disclosure with the aircraft being moved from sunlight into the shade of a hangar.

Referring now to FIG. 2, a schematic drawing of an FDIR system 200 used in accordance to an embodiment of the disclosure in which an aircraft 112 is moved into a hangar 109 and out of the sunlight 111 causing a decrease in the surface temperature of the aircraft 112. FDIR system 200 is substantially similar to FDIR system 100. FDIR system 200 generally comprises a camera 104 and a processing system 106. In some embodiments, FDIR system 200 may also comprise an environmental sensor 103, I/O devices 105, and/or a user interface 107. FDIR system 200 may optionally comprise an emitter 102 (not shown) that is not physically integrated with the camera 104 and the processing system 106. In some embodiments, a physically separate emitter 102 may be configured to emit a higher intensity infrared radiation 108 than a fully integrated emitter 102 as in FDIR system 100. In other embodiments, a physically separate emitter 102 may enable infrared radiation 108 to be imposed on the composite component 114 at an angle to avoid direct reflection of infrared radiation to other components of the FDIR system 100. In some embodiments, a non-integrated, physically separate emitter 102 may be employed at an angle of about 10-20° offset from the camera 104 to avoid direct reflection of infrared radiation 108 to the camera 104.

Referring now to FIG. 3, a temperature versus time graph 300 of the effect of exposing a composite component, such as composite component 114, to infrared radiation 108 is shown according to an embodiment of the disclosure. Time (seconds) is shown on the x-axis, and Temperature (° F.) is shown on the y-axis. Temperature velocity (ΔT/Δt) is also shown on the far right of the graph 300 along the y-axis. Graph 300 comprises a temperature curve 302 and a velocity curve 304 of one example of a composite component 114 that is exposed to infrared radiation 108. The temperature curve 302 depicts the relative temperature of the composite component 114 as it is continuously exposed to the infrared radiation 108. The velocity curve 304 depicts the relative change in temperature with respect to time of the composite component 114 may be the first order derivative used in the aforementioned image post-processing, and the rate of change of the slope of velocity curve 304 may be the second order derivative used in the aforementioned image post-processing. Generally, the infrared radiation 108 imposed up on a composite component 114 may generally be absorbed thermally by the composite component 114, causing the composite component 114 to heat up. In this example, the temperature curve 302 illustrates that the composite component 114 increases in temperature from about 80° F. to about 115° F. while exposed to infrared radiation 108 for about 160 seconds. Velocity curve 304 illustrates that the temperature velocity decreases from about 0.44° F./second to about 0.05° F./second. Thus, it will be appreciated that composite component 114 increases in temperature more rapidly when it is first exposed to the infrared radiation 108 as indicated by the temperature velocity curve 304. Accordingly, detection of defects by FDIR system 100 may generally be enhanced when thermal images are captured quickly after a composite component 114 is exposed to infrared radiation 108. Graph 300 also illustrates that a composite component may continue to increase in temperature for a period of at least 180 seconds. Thus, a thermal flux may generally be created in the composite component 114 for a period of at least 180 seconds after continuous exposure to infrared radiation 108, thereby providing inspection opportunity for at least about 180 seconds after initial exposure of a composite component 114 to infrared radiation 108. It will be appreciated that the information in FIG. 3 can be performed on an element level (e.g. pixel-by-pixel) rather than using image subtraction or division to produce post-processed images that may provide enhanced defect detection over captured thermal images that have not been post-processed.

Figure 4B:
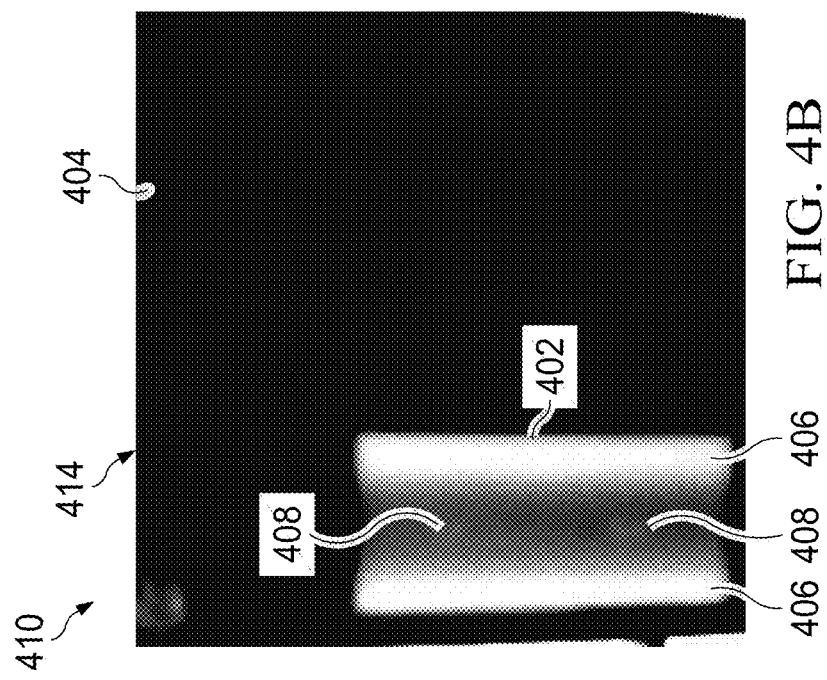
FIG. 4B is an infrared image of the composite component of FIG. 4A according to an embodiment of the disclosure.
Figure 4A:
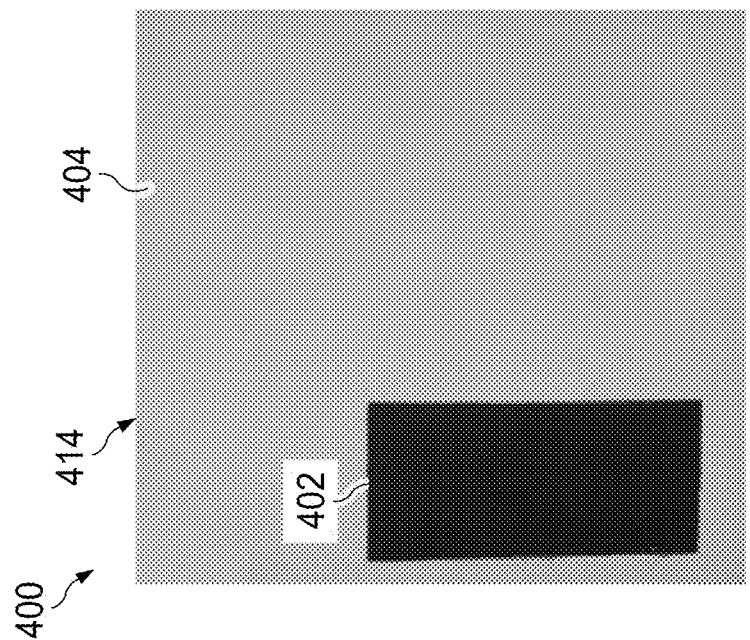
FIG. 4A is an image of a composite component according to an embodiment of the disclosure.

Referring now to FIGS. 4A and 4B, an image 400 of a composite component 414 and an infrared image 410 of the composite component of FIG. 4A taken by FDIR system 100 in FIG. 1 are shown, respectively, according to embodiments of the disclosure. It should be noted that composite component 414 is substantially similar to composite component 114. Infrared imaging of camera 104 may generally be sensitive to the surface emissivity of a composite component 414. A low surface emissivity of a composite component 414 generally reduces the amount of emitted infrared radiation 110 visible by a camera 104 regardless of the thermal changes occurring within the component. On the contrary, a high surface emissivity of a composite component 414 may generally improve the amount of emitted infrared radiation 110 detected by the camera 104. Image 400 depicts a composite component 414 comprising a gloss white painted section 404 and a high emissive black painted section 402. The gloss white painted section 404 may generally comprise a common gloss white aircraft paint scheme. After imposing infrared radiation, such as infrared radiation 108, onto the composite component 414, infrared image 410 of the composite component 414 of FIG. 4A was captured. In this example, the high emissive black painted section 402 indicated an increased temperature of 26° F. while the gloss white painted section 404 indicated an increased temperature of only 8° F. The gloss white painted section 404 comprises a low surface emissivity, thereby emitting a very low amount of infrared radiation 110 as compared to the high emissive black painted section 402. The high emissive black painted section 402 comprises a high surface emissivity, thereby emitting a high amount of infrared radiation 110, thereby allowing an infrared camera, such as camera 102, to detect the underlying structure of the composite component 414.

In some embodiments, the high emissive black painted section 402 may allow an infrared imaging camera, such as camera 104, to detect the underlying I-beam substructure as shown by beams 406. Furthermore, defects 408 are also visible in the composite component 414 through an infrared imaging camera, such as camera 104, in the high emissive black painted section 402. Accordingly, in some embodiments, applying a thin layer of high emissive black paint to the surface of a composite component 414 may generally enhance surface emissivity and thus increase defect detection in composite components. In some embodiments, a thin layer of high emissive black paint/coating applied to the composite component 414 may enable detection of thermal variations as low as about 0.1° F. However, in embodiments where the purpose of inspection is to detect substructure of the composite component 414 which often comprises temperature differences of about 1-5° F., a high emissive coating may not be required. Thus, in some embodiments, substructure may generally be detected by FDIR system 100 in composite components 414 with low surface emissivity.

Figure 5B:
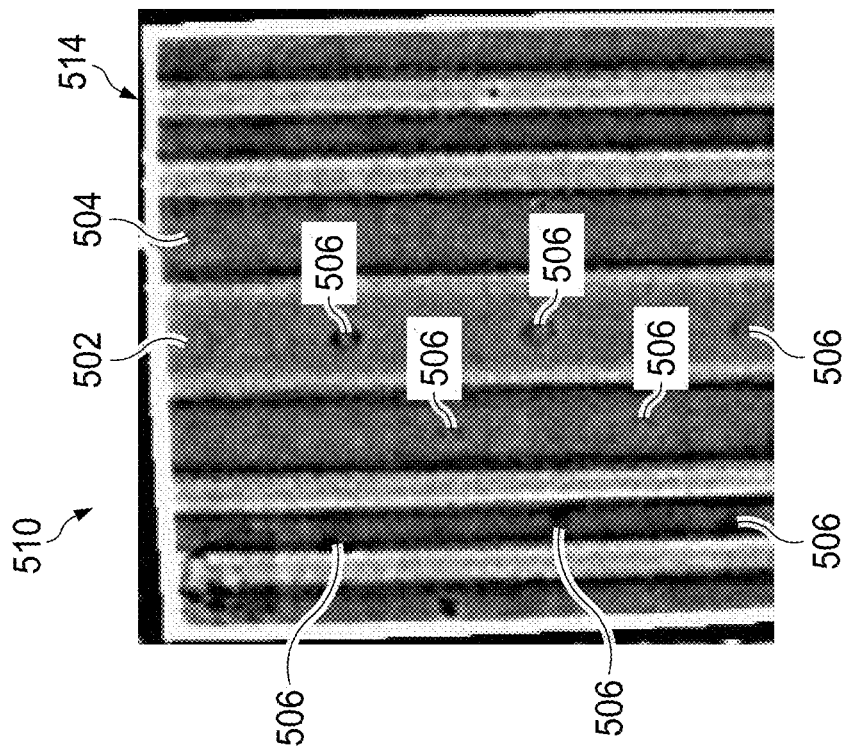
FIG. 5B is a post-processed image of the infrared image of FIG. 5A according to an embodiment of the disclosure.
Figure 5A:
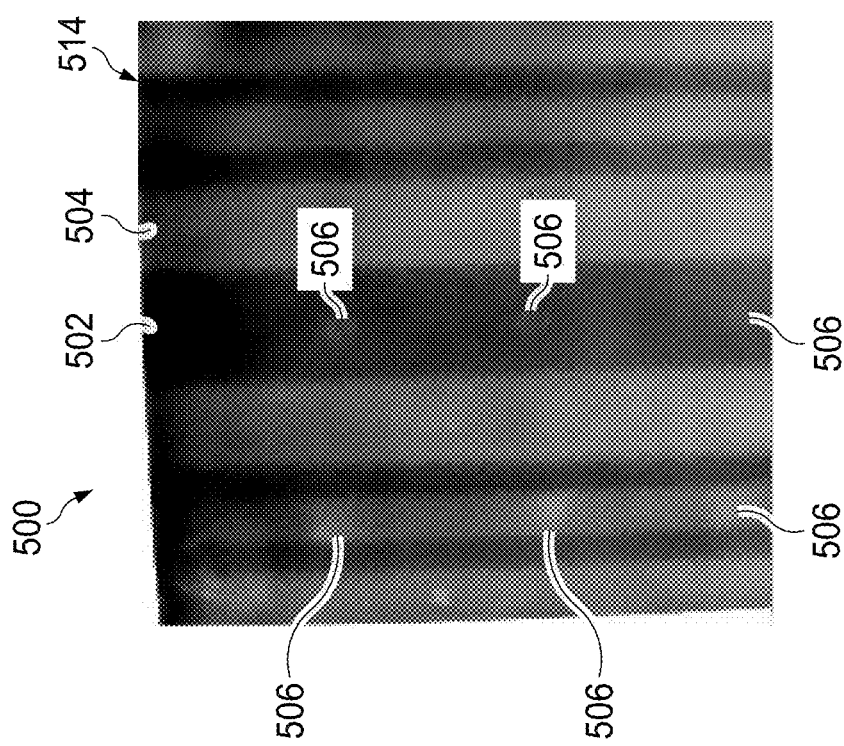
FIG. 5A is an infrared image of a first composite component according to an embodiment of the disclosure.

Referring now to FIG. 5A, an infrared image 500 of a first composite component 514 is shown according to an embodiment of the disclosure. It should be noted that composite component 514 is substantially similar to composite component 114. Infrared image 500 of composite component 514 was captured using FDIR system 100 after imposing infrared radiation, such as infrared radiation 108, onto the composite component 514. In some embodiments, the infrared image 500 may generally depict the subsurface structure of a composite component 514. The different shades illustrated by the dark areas 502 and the light areas 504 may generally reveal the substructure of a composite component 514. This is due to different thickness elements that comprise the substructure of the composite component 514. In some embodiments, the dark areas 502 may comprise thicker substructure components that represent cooler areas of the composite component 514. Furthermore, the light areas 504 may comprise thinner substructure components, such as thin, high emissive panels, that show up lighter due to higher temperatures imposed by imposed infrared radiation 108. In this example, as depicted in infrared image 500, the dark areas 502 generally comprise substructure components that are hat stiffeners of a composite panel.

In addition to revealing substructure, the infrared image 500 also illustrates subsurface defects 506 captured by FDIR system 100. In this example, infrared image 500 illustrates six defects 506. It should be noted that defects 506 detected by FDIR system 100 may comprise defects in any portion of the substructure of the composite component 514. In this example, defects 506 are shown in both the dark areas 502 and light areas 504 of the substructure, which represent thick and thin areas, respectively. In some embodiments, thermal images, such as infrared image 500, captured by the FDIR system 100 may also generally allow the characterization of such defects. Defects 506 detectable by FDIR system 100 may comprise impact damage, delamination, voids, fluid ingression, and/or other various manufacturing defects such as the presence of foreign materials. In this example, defects 506 comprise impact defects.

Referring now to FIG. 5B, a post-processed image 510 of the infrared image 500 of FIG. 5A is shown according to an embodiment of the disclosure. In some embodiments, infrared images, such as infrared image 500, may generally be processed by a processing system, such as processing system 106, to produce post-processed image 510. In some embodiments, infrared image 500 may be post-processed to achieve better results from the FDIR system 100. In some embodiments, infrared image 500 may be post-processed to enhance contrast or provide detection of a larger number of defects, such as defects 506 in the composite component 514. In some embodiments, post-processing may also promote characterization of such defects. In this example, infrared image 500 depicted six defects 506. However, after post-processing infrared image 500, post-processed image 510 depicts eight defects 506. Furthermore, post-processed image 510 comprises a higher contrast than infrared image 500, which, in some embodiments, provides a better image of the underlying substructure of a composite component 514. Accordingly, in some embodiments, post-processing thermal images may improve defect detection or enhance underlying substructure imaging.

Figure 6B:
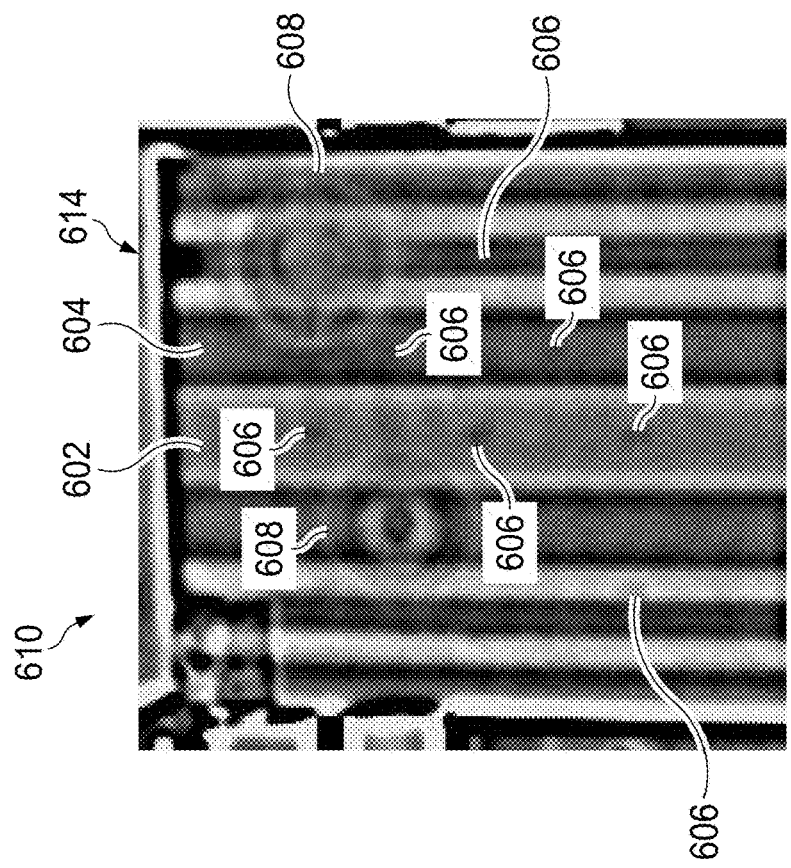
FIG. 6B is a post-processed image of the infrared image of FIG. 6A according to an embodiment of the disclosure.
Figure 6A:
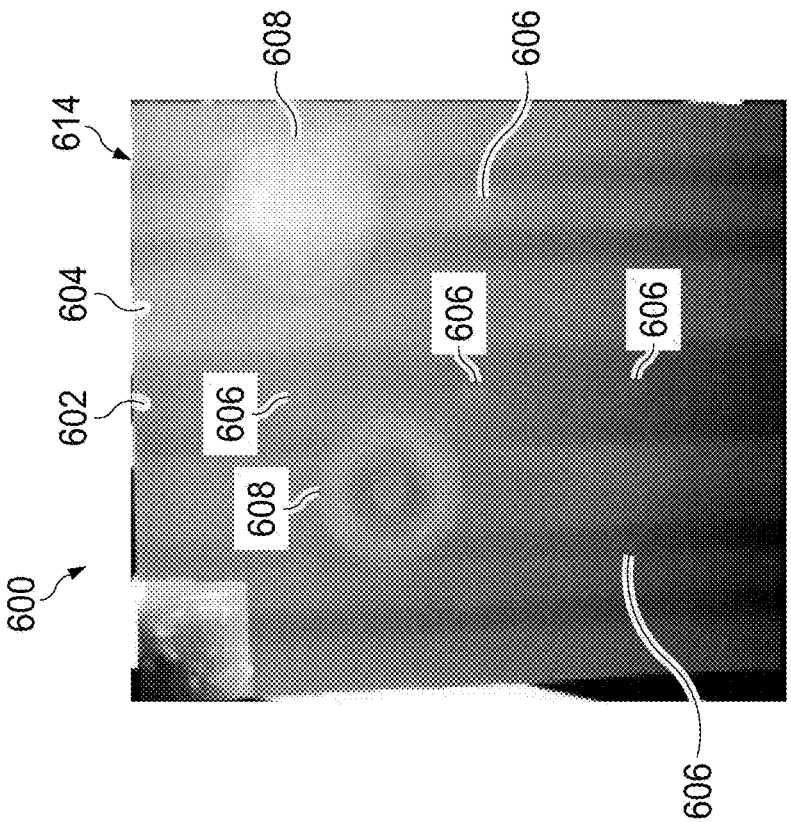
FIG. 6A is a is an infrared image of a second composite component according to an embodiment of the disclosure.

Referring now to FIG. 6A, an infrared image 600 of a second composite component 614 is shown according to an embodiment of the disclosure. Composite component 614 is substantially similar to composite component 114. Infrared image 600 of composite component 614, similarly to infrared image 500 in FIG. 5, was captured using FDIR system 100 after imposing infrared radiation, such as infrared radiation 108, onto the composite component 614. Infrared image 600, similarly to infrared image 500 in FIG. 5, also depicts the substructure of the composite component 614, denoted by the dark areas 602 and the light areas 604, and the defects 606 present in the composite component 614. Additionally, in some embodiments, infrared image 600 captured using FDIR system 100 may also reveal composite repairs 608 invisible under ambient lighting. In this example, composite repairs 608 may comprise composite doubler plugs. In some embodiments, the infrared image 600 captured by FDIR system 100 may also be configured to reveal substructure through composite repairs 608. In some embodiments, revealing substructure through composite repairs 608 may generally allow an inspector to distinguish repaired areas 608 from unrepaired defects 606. Furthermore, in some embodiments, skin surface thickness may also be detected through composite repairs 608. In this example, hat stiffener flanges, denoted as dark areas 602, and thinner skin areas, denoted as light areas 604, may be detected through composite repairs 608.

Referring now to FIG. 6B, a post-processed image 610 of the infrared image 600 of FIG. 6A is shown according to an embodiment of the disclosure. In some embodiments, infrared images, such as infrared image 600, may generally be processed by a processing system, such as processing system 106, to produce post-processed image 610. In some embodiments, post-processed image 610 may generally provide substantially similar benefits that post-processed image 510 in FIG. 5 may provide. In addition, post-processed image 610 with composite repairs 608 may further enhance the substructure underlying the composite repairs 608. Post-processed image 610, when compared to infrared image 600, enhances the contrast between the underlying substructure, denoted by dark areas 602 and light areas 604, defects 606, and the composite repairs 608. In some embodiments, post-processed images, such as post-processed image 610, may also reveal defects in the underlying substructure located below composite repairs 608 that may not have been visible in an unprocessed image, such as infrared image 600.

Figure 7:
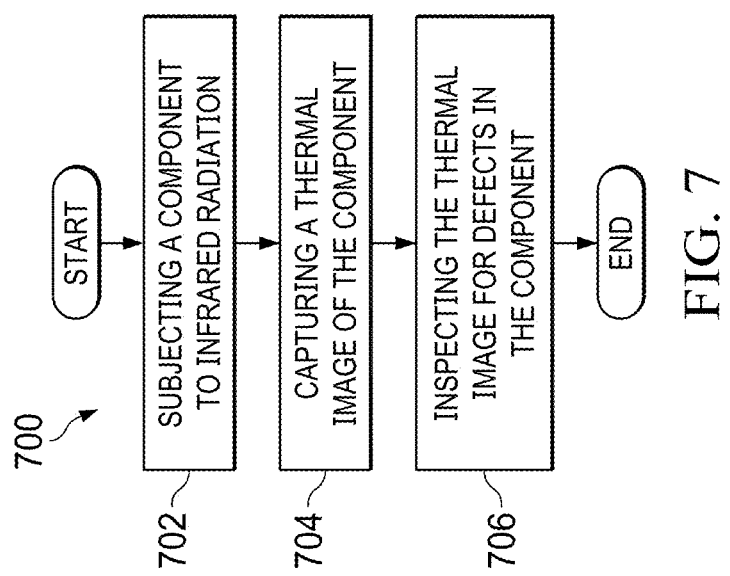
FIG. 7 is a flowchart of a method of inspecting a composite component for damage using a field deployable infrared inspection system according to an embodiment of the disclosure.

Referring now to FIG. 7, a flowchart of a method 700 of inspecting a composite component for damage using a field deployable infrared inspection system according to an embodiment of the disclosure is disclosed. Method 700 may begin at block 702 by subjecting a component (such as composite component 114 in FIGS. 1A, 1B) to infrared radiation (such as infrared radiation from sunlight 111, removal from sunlight 111 into the shade, or placing the aircraft into a shaded area (such as a hangar), or moving the aircraft 112 from an area that is warm to an area that is cooler, or vice versa, and measuring within the predetermined amount of time, typically within 45, 60, or 90 seconds (but sometimes up to 100, 120, 150, 180, 240, or even 300 seconds when the area of interest is deeper in the structure) the change in temperature of the aircraft 112 that is sufficient at long wave IR to detect subsurface defects of major structural components). Method 700 may continue at block 704 by capturing a thermal image of the component using an infrared sensitive camera (such as camera 104 in FIGS. 1A, 1B). Method 700 may conclude at block 706 by inspecting the thermal image captured for defects in the component, which may employ processing system 106 in FIGS. 1A, 1B to process the captured infrared image and/or post-process the captured infrared image.

An important advantage of the present invention is the ability to use a low-cost detector/camera to rapidly detect defects in the field. The capture techniques of the present invention allow, for the first time, to provide an extremely portable, rapid, and low cost system and method for the inspection of composite surfaces and/or the underlying structures. The images captured with a long wave IR camera, may be saved to an SD card or other storage medium or evaluated directly in the camera. Short wave camera costs start at about $60,000 and requires an externally powered chiller, computer processor, monitor, thermal emitter, etc., bringing the cost up to about $130,000 to $250,000 and the system is not as portable and is less intuitive, thus requiring a significant amount of training and device maintenance. One example of a long wave forward-looking infrared (FLIR) camera has the processing system, environmental sensors, I/O devices, and/or user interface built into the camera.

Another important advantage of the present invention is that, unlike aluminum aircraft where it is easy to see a bird strike, hail damage, ground handling damage, or a large dent at the damaged area, composite materials do not dent, but rather, they delaminate, fracture and disbond. Most often, composite materials show no sign on the surface of the material that the area is damaged, which is further compounded with defects below the surface of the composite material. Generally, field operators will not have the training or skills to use a short wave camera system, if they could afford such a complex and expensive system. The present invention provides sufficient resolution to maximize both affordability and functionality.

Furthermore, the methods of the present invention can be optimized to: (1) manually focus the camera at the area of interest on the aircraft, (2) manually compress the temperature range to obtain as much contrast as possible in the color palette, and (3) capture images in the first 60-90 seconds (as illustrated in FIG. 3) after the panel(s)/fiber reinforced composite structure has changed its temperature exposure at least 10 degrees F. (move the item of interest or shield it from sunlight with shading, etc.).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A method for detecting defects in a fiber reinforced composite component of an aircraft comprising:
   providing an aircraft comprising a fiber reinforced composite component, wherein the fiber reinforced composite component is at a relatively homogeneous ambient temperature;
   subjecting the fiber reinforced composite component that is at the relatively homogeneous ambient temperature to infrared (IR) radiation by exposure to sunlight to cause a temperature change of at least 10 degrees Fahrenheit in the fiber reinforced composite component, wherein the relatively homogeneous ambient temperature and the temperature change are within a range of about 80 to about 120 degrees Fahrenheit;
   using a hand-held, long-wavelength IR camera to capture thermal images of the fiber reinforced composite component, wherein the camera has an adjustable temperature control that captures thermal images having a working range of 10 degrees Fahrenheit, wherein the camera has a frame capture rate of at least 1 second for a length of time of not less than 90 seconds, and wherein the thermal images are captured within a predetermined amount of time from a start of the temperature change;
   post-processing the thermal images using a second order derivative algorithm wherein the post-processed thermal images show more detail of defects than the captured thermal images; and
   detecting one or more defects in the fiber reinforced composite component without the need for a coating or an electronic light source.

2. The method of claim 1, further comprising using a processing system coupled to a user interface to process the captured thermal images on a pixel-by-pixel basis to produce processed images, wherein the processed images show more detail of defects than the captured thermal images.

3. The method of claim 2, further comprising using the processing system to enhance the contrast of the captured thermal images using at least one of a first order derivative algorithm and a second order derivative algorithm.

4. The method of claim 2, further comprising using input and output devices coupled to the processing system and configured to communicate with the external device to transfer the captured thermal images, the processed images, or both, to an external device.

5. The method of claim 2, further comprising using an environmental sensor coupled to the processing system to detect an environmental factor and to associate the environmental factor with the captured thermal images.

6. The method of claim 2, further comprising using location sensing devices coupled to the processing system provide location based data.

7. The method of claim 1, wherein an area of detection is a sub-structure, or the fiber reinforced composite materials are of low thermal conductivity located on a metallic sub-structure, and the processed image shows integrity and location on the aircraft.

8. The method of claim 1, wherein the hand-held, long-wavelength IR camera has an integrated processor, an environmental sensor, input and output devices, and a user interface.

9. The method of claim 1, wherein the predetermined amount of time from the start of the temperature change is 30, 60, 90, or 120 seconds.

10. An apparatus, comprising:
    a hand-held, long-wavelength IR camera configured to capture thermal images of a fiber reinforced composite component at a relatively homogeneous temperature and during a temperature change of at least 10 degrees Fahrenheit in the fiber reinforced composite component, wherein the temperature change is caused by exposure to sunlight, wherein the relatively homogeneous ambient temperature and the temperature change are within a range of about 80 to about 120 degrees Fahrenheit, wherein the camera has an adjustable temperature control that captures the thermal images with a working range of 10 degrees Fahrenheit, and wherein the camera has a frame capture rate of at least 1 second for a length of time of not less than 90 seconds;
    a processing system coupled to the hand-held, long wavelength IR camera, wherein the processing system is configured to process the captured infrared images on a pixel-by-pixel basis and to determine whether a defect exists within the fiber reinforced composite component without the need for a coating or an electronic light source; and
    a user interface coupled to the processing system and configured to process the captured thermal images on a pixel-by-pixel basis and to produce processed images, wherein the processed images show the defect better than the captured infrared images.

11. The apparatus of claim 10, wherein the processing system is configured to enhance the contrast of the captured infrared images using a second order derivative algorithm.

12. The apparatus of claim 10, wherein the fiber reinforced composite component is located on an aircraft.

13. An apparatus operable to detect defects in a fiber reinforced composite component of an aircraft comprising:
    a hand-held long-wave IR camera configured to capture thermal images of the fiber reinforced composite component at a relatively homogeneous ambient temperature and during a temperature change of at least 10 degrees Fahrenheit in the fiber reinforced composite component, wherein the temperature change is caused by exposure to sunlight, wherein the relatively homogeneous ambient temperature and the temperature change are within a range of about 80 to about 120 degrees Fahrenheit, wherein the hand-held long-wave IR camera has an adjustable temperature control configured to capture the thermal images with working range of 10 degrees Fahrenheit and a frame capture rate of at least 1 second for a length of time of not less than 90 seconds; and a processor for post-processing the thermal images using a second order derivative algorithm wherein the post-processed thermal images show the defect better than the captured infrared images, to detect one or more defects in the fiber reinforced composite component without the need for a coating, an electronic light source, or an electronic heat source.

14. The apparatus of claim 13, wherein the hand-held long-wave IR camera is configured to capture the thermal images at an offset angle of at least about 10 degrees of arc from the electronic source or the electronic heat source.

* * * * *